United States Patent
Burcham et al.

(12) 
(10) Patent No.: US 10,554,604 B1
(45) Date of Patent: Feb. 4, 2020

(54) LOW-LOAD MESSAGE QUEUE SCALING USING EPHEMERAL LOGICAL MESSAGE TOPICS

(71) Applicant: Sprint Communications Company L.P., Overland Park, KS (US)

(72) Inventors: Robert H. Burcham, Overland Park, KS (US); Geoffrey A. Holmes, Overland Park, KS (US)

(73) Assignee: Sprint Communications Company L.P., Overland Park, KS (US)

( * ) Notice: Subject to any disclaimer, the term of this patent is extended or adjusted under 35 U.S.C. 154(b) by 498 days.

(21) Appl. No.: 15/398,711

(22) Filed: Jan. 4, 2017

(51) Int. Cl.
G06F 15/16 (2006.01)
H04L 12/58 (2006.01)
H04L 12/26 (2006.01)
H04L 29/08 (2006.01)

(52) U.S. Cl.
CPC .......... *H04L 51/16* (2013.01); *H04L 43/0876* (2013.01); *H04L 51/046* (2013.01); *H04L 51/066* (2013.01); *H04L 51/20* (2013.01); *H04L 67/2809* (2013.01)

(58) Field of Classification Search
CPC ....... H04L 63/123; H04L 67/10; H04L 67/16; H04L 67/1008; H04L 67/1097; H04L 67/322; H04L 41/069; H04L 41/5016; H04L 41/0609

USPC ................. 709/205–206, 224, 226
See application file for complete search history.

(56) References Cited

U.S. PATENT DOCUMENTS

| | | | |
|---|---|---|---|
| 2016/0269343 A1* | 9/2016 | Li | H04L 51/32 |
| 2018/0097748 A1* | 4/2018 | Pienescu | G06F 16/285 |
| 2018/0176174 A1* | 6/2018 | Sherman | H04L 67/2838 |

* cited by examiner

Primary Examiner — Farzana B Huq (57) ABSTRACT

A messaging middleware platform implemented on a computer system. The platform comprises a directory service application that maps logical to physical topic references, where the physical topic references refer to message topics instantiated on message broker instances, a plurality of message producer instances that execute on the computer system, where each message producer instance stores messages on message topics instantiated based on a logical topic reference built into the message producer and dereferenced to a physical topic reference at run-time, and a workflow manager application that executes on the computer system that creates new message broker instances when the message depth exceeds a predefined threshold, revises associations between logical topic references and physical topic references in the directory service application, and causes the message producer instances to be reconfigured to dereference the logical topic reference to a physical topic reference associated with the new message broker instances.

20 Claims, 7 Drawing Sheets

LOW-LOAD MESSAGE QUEUE SCALING USING EPHEMERAL LOGICAL MESSAGE TOPICS

CROSS-REFERENCE TO RELATED APPLICATIONS

None.

STATEMENT REGARDING FEDERALLY SPONSORED RESEARCH OR DEVELOPMENT

Not applicable.

REFERENCE TO A MICROFICHE APPENDIX

Not applicable.

BACKGROUND

A messaging middleware system may receive messages from a first set of computer applications, store the received messages, and fulfill requests from a second set of computer applications to read the stored messages. The messaging middleware system may execute on a computer system. Some of the first set of computer applications may be client applications that are requesting some processing be performed on content they provide in the messages they send to the messaging middleware system. Some of the second set of computer applications may be back-end processing applications that do work on the content in the messages. For example, a back-end application (e.g., one of the second set of computer applications) may store the content in the message in a back-end data store. Alternatively, the back-end application may retrieve an entry requested by a client application from a back-end data store and send the content of the entry in a message sent to the messaging middleware, and the client application may retrieve the message from the messaging middleware that contains the entry.

The messaging middleware decouples the first set of computer applications, which may be referred to as front-end applications, from the second set of computer applications, which may be referred to as back-end applications. The messaging middleware can relieve both the front-end applications and the back-end applications from integrating with each other and of needing to synchronize with each other. The messaging middleware can be designed to persist the messages and do something intelligent in the event of exceptions or of failure of the computer systems on which the messaging middleware executes.

SUMMARY

In an embodiment, a computer system that provides a messaging middleware platform that provides low-load message queue scaling is disclosed. The system comprises at least one processor, at least one non-transitory memory, a directory service application stored in the at least one non-transitory memory, and a workflow manager stored in the at least one non-transitory memory. When executed by the at least one processor the directory service application creates an association between a logical topic reference and a first physical topic reference in response to receiving a first association creation request and provides the first physical message topic reference to a first request from a message producer instance based on the logical message topic reference provided in the first request. When executed by the at least one processor the workflow manager monitors a processing load of the messaging middleware platform and, in response to determining that the processing load of the messaging middleware platform exceeds a predefined threshold sends a second association creation request to the directory service application to associate the logical topic reference to a second physical topic reference. The workflow manager further launches an at least one message broker that executes a second physical topic associated with the second physical topic reference and launches an at least one message consumer instance that is configured to process messages stored by the at least one message broker by requesting messages using the second physical topic reference while leaving at least one other message consumer instance that is configured to process messages requested using the first physical topic reference. The workflow manager further, after launching the at least one message broker that executes the second physical topic, causes the message producer instance to send a second request comprising the logical message topic to the directory service application, where the directory service application provides the second physical message topic reference to the message producer instance, whereby the message producer instance discontinues sending new messages to the first message broker and begins sending new messages to the second message broker and whereby the messages on the second message broker are balanced without transferring messages among message brokers.

In another embodiment, a method of processing event messages via a messaging middleware platform using low-load message queue scaling is disclosed. The method comprises providing a first plurality of message brokers by a workflow manager, where the workflow manager is an application that executes on a computer system that provides the messaging middleware platform and where the first plurality of message brokers executes a first physical topic on the computer system and configuring an association of a first physical topic reference to a logical topic reference by the workflow manager in a directory service, where the directory service is an application that executes on the computer system, where the first physical topic reference refers to the first physical topic executed by the first plurality of message brokers. The method further comprises causing at least one message producer instance to request the first physical topic reference based on the logical topic reference from the directory service, whereby the at least one message producer instance is configured to send messages to the first physical topic, launching an at least one first message consumer instance that is configured to process message stored by the first plurality of message brokers, where the at least one first message consumer instance executes on the computer system, and monitoring a processing load of the first plurality of message brokers by the workflow manager. The method further comprises, in response to determining that the processing load of the first plurality of message brokers exceeds a predefined threshold, providing a second plurality of message brokers by the workflow manager, where the second plurality of message brokers executes a second physical topic on the computer system and configuring an association of a second physical topic reference to the logical topic reference by the workflow manager in the directory service, where the second physical topic reference refers to the second physical topic executed by the second plurality of message brokers. The method further comprises causing the at least one message producer instance to request the second physical topic reference based on the logical topic reference from the directory service, whereby the at least one message producer instance is configured to send messages to the second physical topic and to stop sending messages to the first physical topic and launching an at least one second message consumer instance that is configured to process message stored by the second plurality of message brokers, where the at least one second message consumer instance executes on the computer system, where after launching the at least one second message consumer instance the at least one first message consumer instance continues to process messages stored by the first plurality of message brokers until the messages stored by the first plurality of message brokers exceed a predefined message life duration, whereby the messages on the second plurality of message brokers are balanced without transferring messages among message brokers.

In yet another embodiment, a messaging middleware platform implemented on a computer system is disclosed. The platform comprises a directory service application that maps logical topic references to physical topic references, where the physical topic references refer to message topics instantiated on message broker instances, a plurality of message producer instances that execute on the computer system, where each message producer instance stores messages on message topics instantiated based on a logical topic reference built into the message producer and dereferenced to a physical topic reference at run-time, and a workflow manager application that executes on the computer system that monitors message depth on the message topics, creates new message broker instances when the message depth exceeds a predefined threshold, revises associations between logical topic references and physical topic references in the directory service application, causes the message producer instances to be reconfigured to dereference the logical topic reference to a physical topic reference associated with the new message broker instances, and creates new message consumer instances configured to process the messages on the new message broker instances while leaving old message consumer instances in execution on the computer system to process messages on old message broker instances.

These and other features will be more clearly understood from the following detailed description taken in conjunction with the accompanying drawings and claims.

BRIEF DESCRIPTION OF THE DRAWINGS

For a more complete understanding of the present disclosure, reference is now made to the following brief description, taken in connection with the accompanying drawings and detailed description, wherein like reference numerals represent like parts.

DETAILED DESCRIPTION

It should be understood at the outset that although illustrative implementations of one or more embodiments are illustrated below, the disclosed systems and methods may be implemented using any number of techniques, whether currently known or not yet in existence. The disclosure should in no way be limited to the illustrative implementations, drawings, and techniques illustrated below, but may be modified within the scope of the appended claims along with their full scope of equivalents.

A messaging middleware system that dynamically scales up and scales down its employment of message queue resources through low-load scaling procedures is taught herein. A messaging middleware system desirably increases its message queue resources when messaging loads increase so that message throughput does not slow down, degrading performance of client applications or back-end applications. Likewise, the messaging middleware system desirably decreases its message queue resources when messaging loads decrease so that message processing infrastructure can be repurposed to other processing purposes, thereby increasing the economic efficiency of the computing infrastructure.

In the past, scaling up messaging resources often entailed rebalancing message queues. This involved creating new initially empty message queues and then transferring some messages on already established message queues to the new message queues so the load on the new message queues and the already established message queues was about equal. In some enterprise computing systems, client application loads and corresponding message handling loads may exhibit a diurnal cycle in which loads increase during a first portion of the day and then decrease during a second portion of the day. In conventional messaging middleware systems, the messaging middleware resources may be scaled up multiple times and the associated messaging queues rebalanced as the diurnal load ramps up. The result is the messaging middleware system is in a perpetual queue rebalancing operation that consumes a significant portion of computing resources. The messaging middleware system taught herein conserves those computing resources by obviating message queue rebalancing entirely, which may be referred to as a low-load scaling operation or a zero-cost scaling operation.

As taught herein, message producing applications place messages on a message topic that is implemented as a message queue, and message consuming applications process the messages from the message topic. The message producers are programmed to send messages to a logical message topic reference that resolves to a physical message topic reference, and the logical message topic reference is associated to a physical message topic reference dynamically. The physical topic reference is a reference to a physical message topic. Message consumers are instantiated to consume and/or process messages from the physical message topic. When the messaging middleware system desires to scale up, new physical topics are created, the logical topic reference in the message producers are dynamically re-associated to reference the new physical topics (reconfigured to store a physical message topic reference that refers to or points to the new physical topic), and new message consumers are instantiated that are configured to consume messages from the new physical topics. The existing message consumers that are configured to consume messages from the old physical topics remain in service, consuming messages on the old physical topics, reducing the queue depth of those old physical topics. In this way the messaging middleware system is scaled up without rebalancing message queues, thereby saving computing resources that otherwise would have been consumed in shuffling messages among message queues.

The association of a logical topic reference to a physical topic reference can be viewed as a form of indirect reference. By changing the association, the message producer can redirect what physical topic it writes messages to. In an embodiment, the message producer may look-up the association of its logical topic reference to a corresponding physical topic reference on instantiation (e.g., when initiated) and in response to a command from a workflow manager application that is part of a messaging middleware platform. After the message producer has identified the association of the logical topic reference to the physical topic reference, it continues to send messages to the physical topic reference until a different association is configured into the message producer.

When an old message topic has been fully processed and is no longer having messages written to it (e.g., when new message topics have been created to supplant the old message topic), it may be destroyed, for example after expiration of a timer that tracks duration of time without receiving new messages. Likewise, old message consumers may be destroyed after expiration of a timer that tracks duration of time of no messages being present on the physical topic that the message consumer is associated to. The process of scaling up message middleware resources can also be used to scale down message middleware resources.

Figure 1:
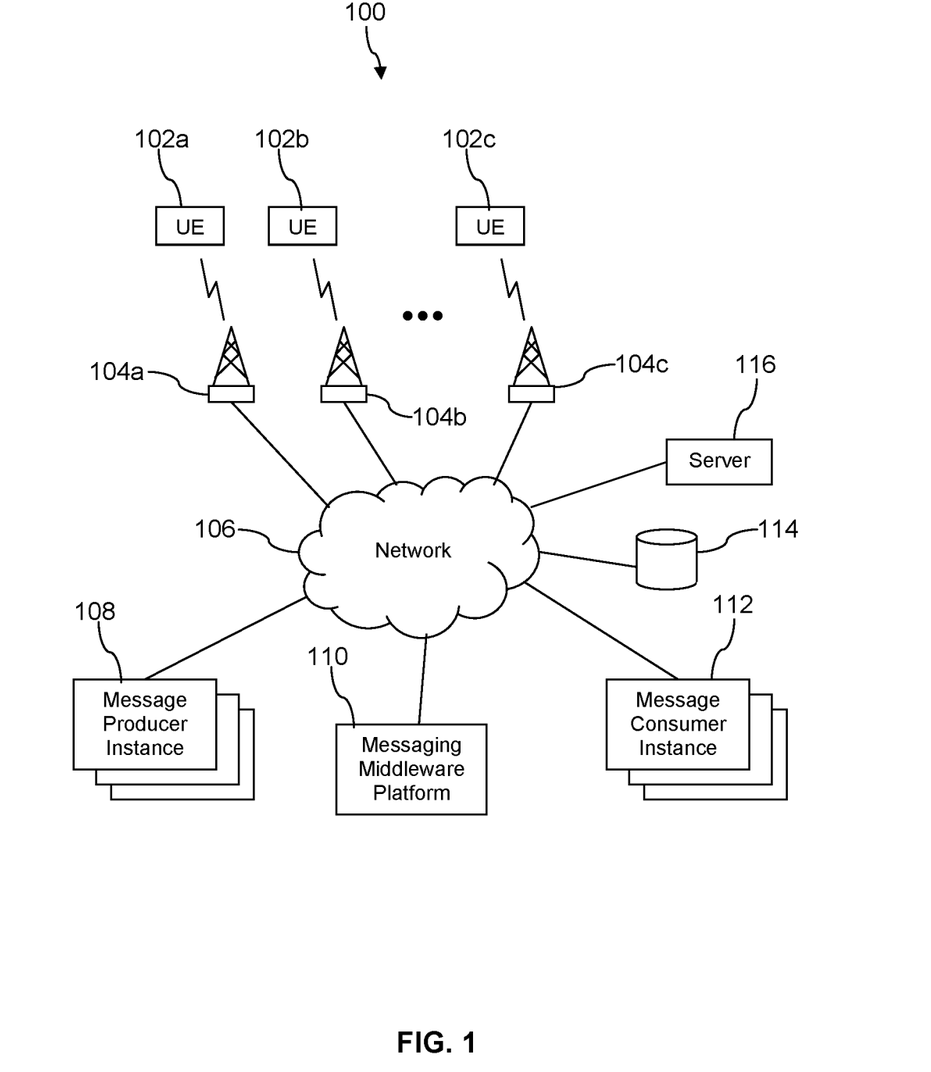
FIG. 1 is a block diagram of a communication system according to an embodiment of the disclosure.

Turning now to FIG. 1, a communication system 100 is described. In an embodiment, the system 100 comprises a plurality of user equipment 102 that receive wireless communication links from cell sites 104. For example, a first UE 102a receives a wireless communication link from a first cell site 104a, a second UE 102b receives a wireless communication link from a second cell site 104b, and a third UE 102c receives a wireless communication link from a third cell site 104c. The system 100 further comprises a communication network 106 that links the cell sites 104 and also provides communication connectivity to other nodes such as content servers, application servers, landline telephones, and other communication terminals (not shown). The network 104 may comprise one or more public networks, one or more private networks, or a combination thereof. The UEs 102 may comprise any mix of mobile phones, personal digital assistants (PDAs), wearable computers, headset computers, media players, laptop computers, notebook computers, or tablet computers. The cell sites 104 may provide wireless communication links to the UEs 102 according to one or more of a long-term evolution (LTE), a code division multiple access (CDMA), a global system for mobile communication (GSM), or a worldwide interoperability for microwave access (WiMAX) telecommunications protocol.

The UEs 102 may transmit status messages or logs. In addition, information about the behaviors of the UEs 102 and/or communication events associated with the UEs 102 may be captured. This information may be collected by network gateways (not shown) or other communication nodes and funneled to a plurality of message producer instances 108. The status messages, logs, behaviors, and communication events may be processed in various ways by the message producer instances 108. The message producer instances 108 may format the information content of the status messages, logs, behaviors, and communication events into a normalized and uniform structure and encapsulate the normalized information in messages. The message producer instances 108 may then send these messages to a messaging middleware platform 110. A plurality of message consumer instances 112 may copy or read messages stored by the messaging middleware platform 110, process the content of those messages, create derived data based on processing the messages, and store the derived data in a data store 114.

The derived data may comprise counts of events such as impressions of mobile advertisements presented on the UEs 102. The derived data may comprise location information associated to the UEs 102. The derived data may comprise logs of web sites navigated to by the UEs 102. The derived data may comprise data on e-commerce purchases initiated from the UEs 102. The derived data may comprise some sort of digest or summarization of raw data that is contained in the messages processed by the message consumer instances 112. The derived data stored in the data store 114 may be mined and analyzed by a marketing application (not shown) that may be used to harvest marketing insights from the derived data. The derived data stored in the data store 114 may be analyzed by a billing application (not shown) to bill advertisers based on counts of impressions. The derived data stored in the data store 114 may be analyzed and used in yet other ways. The marketing application and/or the billing application may execute on a server 116. The server 116 may be implemented as a computer system. Computer systems are described herein after.

Figure 2:
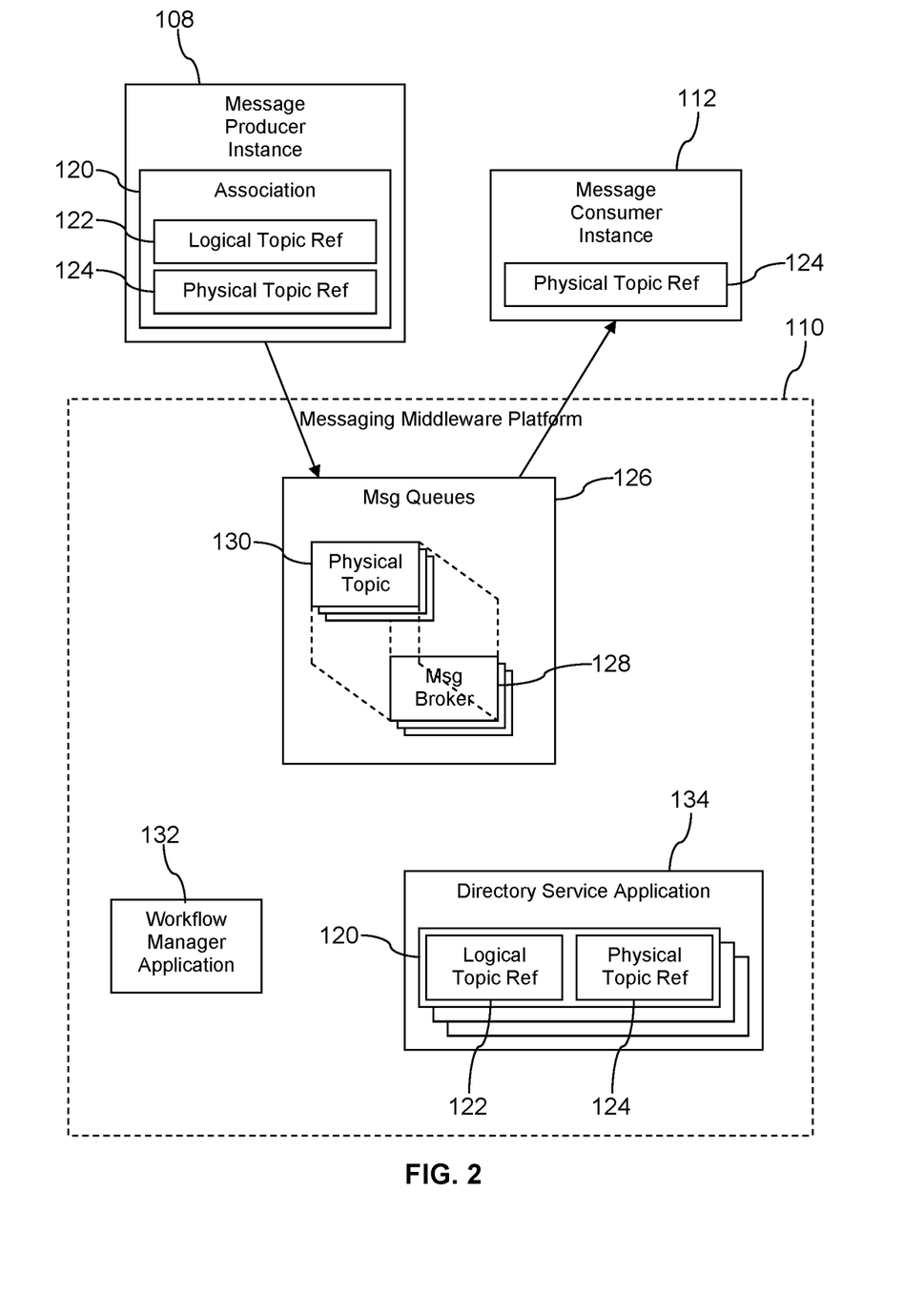
FIG. 2 is a block diagram of a messaging system according to an embodiment of the disclosure.

Turning now to FIG. 2, further details of the message producer instances 108, the messaging middleware platform 110, and the message consumer instances 112 are described. The message producer instances 108 are executing instances of computer programs which execute on a computer system. There may be different computer programs or scripts that are instantiated as message producer instances 108, for example a first program or script for processing a first kind of information, a second program or script for processing a second kind of information, and a third program or script for processing a third kind of information. There may be multiple instances of one of these programs or scripts instantiated and executed, for example there may be 25 instances of the first program that execute, 8 instances of the second program that execute, and 12 instances of the third program that execute. Alternatively, there may a single program that processes all different kinds of information. In a like manner, there may be different computer programs or scripts that are instantiated as message consumer instances 112 that execute on a computer system. These different consumer programs or scripts may process different kinds of messages. Any number of message producer instances 108 and any number of message consumer instances 112 may be executing. The number of message consumer instances 112 changes over time as described further herein.

Each of the message producer instances 108 comprises an association 120 that links or ties a logical topic reference 122 to a physical topic reference 124. It is understood that in an embodiment the association 120 is an abstraction and is not embodied physically (e.g., is not embodied as a variable or a location in memory separate from the logical topic reference 122 and the physical topic reference 124). In an embodiment, the logical topic reference 122 may be a variable name in a script or program that implements the message producer instance 108, and the value of the variable referred to by the variable name may be written or configured in a given message producer instance 108 with a specific physical topic reference. The physical topic reference 124 identifies, points to, references, or specifies an address of a physical topic 130 that is associated with a message queue 126 instantiated by a message broker 128. The message broker 128 is an instance of a script or program that executes on a computer system.

The messaging middleware platform 110 may be executed on a computer system. The messaging middleware platform 110 comprises the message queues 126 implemented by the message brokers 128. The messaging middleware platform 110 further comprises a workflow manager application 132 that executes on a computer system. In an embodiment, the messaging middleware platform 110 further comprises a directory service application 134 that defines associations 120 between logical topic references 122, and physical topic references 124. The directory service application 134 executes on a computer system. Computer systems are described further hereinafter. The message brokers 128, the workflow manager application 132, and the directory service application 134 may execute on the same computer system or on different computer systems.

The message producer instance 108 formats messages in a normalized or standardized format. This normalized format may comprise JSON files or another content independent format. The message producer instance 108 transmits the formatted message to the physical topic 130 identified by the physical topic reference 124. On instantiation the message producer instance 108 may call upon the directory service application 134 to resolve the association 120, for example to receive the physical topic reference 124 currently associated to the logical topic reference and to configure that value into a local variable or storage of the physical topic reference 124 in the message producer instance 108.

It is understood that the implementation of the message producer instance 108, for example logic instructions in the form of a script or a computer program, may use a logical topic reference 122 that does not refer to any actually implemented message queue 126 but is a logical construct that must be configured with an actual or physical topic reference 124. For example, the logical topic reference 122 may refer to an "ad impression count bucket topic," while the physical topic reference 124 stored in or assigned to the "ad impression count bucket topic" is an address or other actual reference that can be used to place a message on the message queue 126 that embodies the physical topic 130. The message consumer instance 112 reads or copies messages from the message queue 126 using the physical topic reference 124. The message consumer instance 112 then processes the message it reads or copies.

The workflow manager application 132 monitors the depth of messages on message queues 126 and/or the physical topics 130. When the depth of messages is too great, it may create new message queues 126 and/or physical topics 130, create a new association 120 of the logical topic reference 122 and a new physical topic reference 124 that reference the new physical topics 130, and then cause the message producer instances 108 to revise their associations 120 by requesting the directory service application 134 to resolve the logical topic reference 122 to the currently associated physical topic reference. Because this association 120 has been modified, the message producer instances 108 therefore revise their mapping of the logical topic reference 122 to the different physical topic reference 124 and send newly created messages not to the old physical topic 130 but to the new physical topic 130.

Figure 3A:
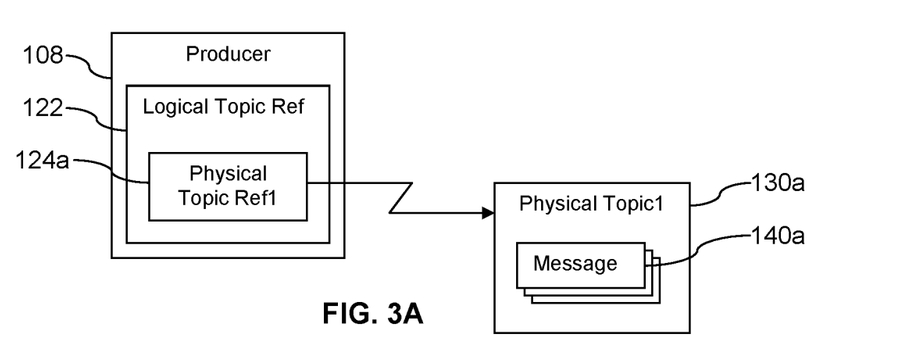
FIG. 3A, FIG. 3B, and FIG. 3C is an illustration of a sequence mappings of logical topic references to physical topic references in a messaging system according to an embodiment of the disclosure.
Figure 3B:
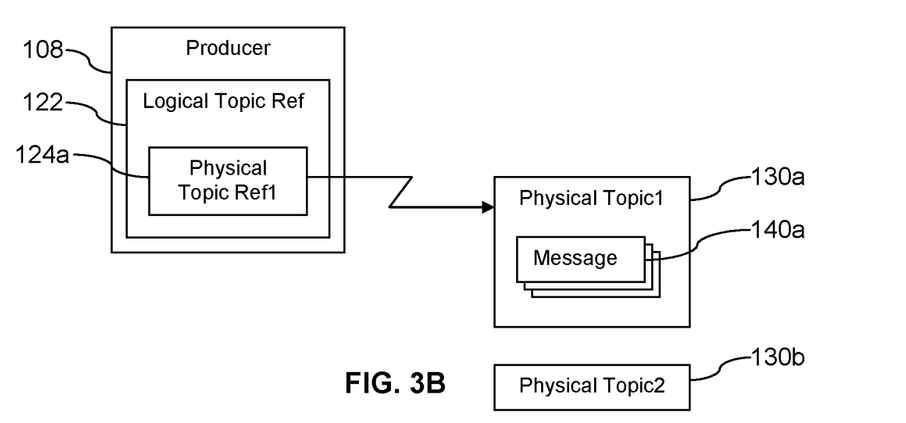
Figure 3C:
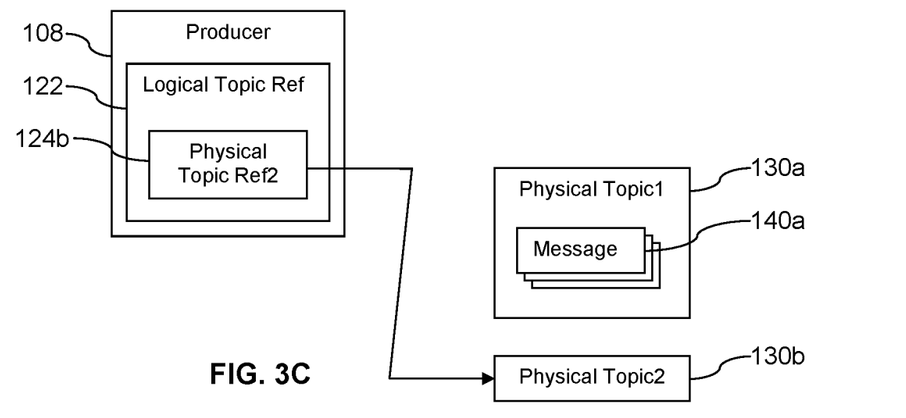

Turning now to FIG. 3A, FIG. 3B, and FIG. 3C, this remapping of logical topic references 122 to physical topic references 124 is discussed further. In FIG. 3A, the logical topic reference 122 of a message producer instance 108 stores or is associated to a first physical topic reference 124a that refers to or addresses a first physical topic 130a that stores a first plurality of messages 140a. It is understood that the first physical topic 130a may be associated to a message queue 126 managed or controlled by a message broker 128.

In FIG. 3B, the workflow manager application 132 creates a second physical topic 130b. Initially no messages 140 are stored in the new physical topic 130b, because no message producer instance 108 is configured to write messages to it (e.g., no message producer instance 108 has been configured with a mapping of the logical topic reference 122 to the physical topic reference 124 of this new physical topic 130b). In FIG. 3C, the logical topic reference 122 has been resolved (e.g., by looking up the association 120 via the directory service application 134) to a second physical topic reference 124b that refers to or addresses the second physical topic 130b. As the message producer instance 108 writes new messages it will no longer write them to the first physical topic 130a but instead will write them to the second physical topic 130b. The first physical topic 130a remains, at least temporarily, as do the first plurality of messages 140a.

Figure 4A:
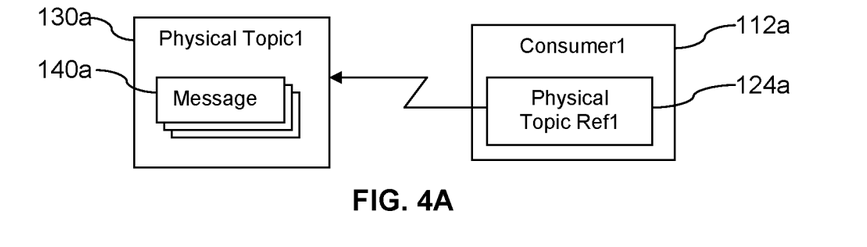
FIG. 4A, FIG. 4B, and FIG. 4C is an illustration of a sequence of message consumer instances in a messaging system according to an embodiment of the disclosure.
Figure 4B:
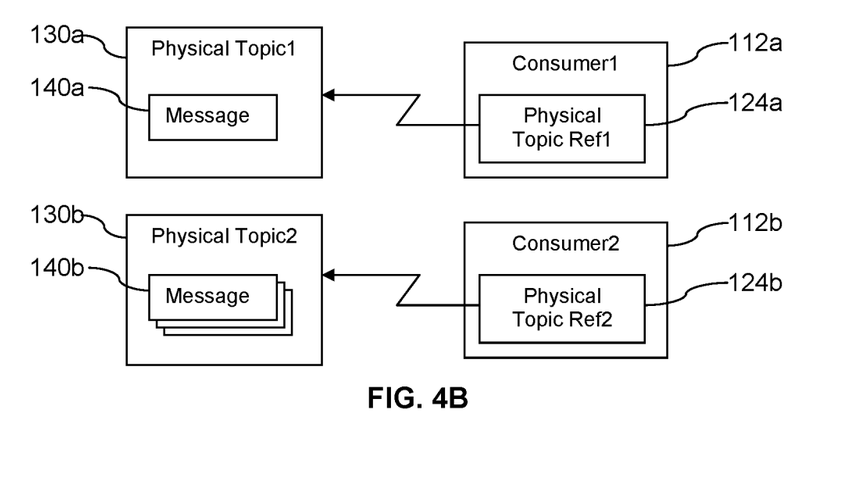
Figure 4C:
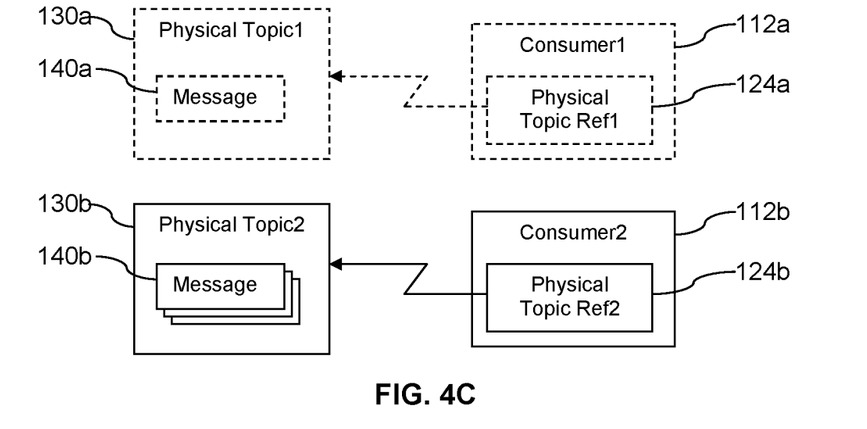

Turning now to FIG. 4A, FIG. 4B, and FIG. 4C, this remapping of logical topic references 122 to physical topic references 124 is discussed further. In FIG. 4A, a first message consumer instance 112a is represented configured with the first physical topic reference 124a. When it executes, the first message consumer instance 112a uses the first physical topic reference 124a to receive or copy one of the first plurality of messages 140a stored on the first physical topic 130a. For example, the first message consumer instance 112a requests a message (or a copy of a message) from the message broker 128 providing in this request the first physical topic 130a. The first message consumer instance 112a receives the message and processes it. The first message consumer instance 112a continues requesting and processing messages iteratively.

In FIG. 4B, the second physical topic 130b has been created by the workflow manager application 132, and a second plurality of messages 140b have been stored on the second physical topic 130b (e.g., the message producer instance 108 has been updated or reconfigured so its logical topic reference 122 now stores the second physical topic reference 124b and has written messages to the second physical topic 130b). The first message consumer instance 112a continues to reference the first physical topic 130a and to consume the first plurality of messages 140a. Because the message producer instance 108 no longer places messages on the first physical topic 130a, the first plurality of messages 140a is not replenished with new messages and over time is drained or emptied by the first message consumer instance 112a. To suggest this draining, the first plurality of messages 140a is represented in FIG. 4B as reduced to a single message. The workflow manager application 132 has also instantiated a second message consumer instance 112b and configured it with the second physical topic reference 124b. The second message consumer instance 112b, therefore, reads messages from the second plurality of messages 140b stored on the second physical topic 130b.

In FIG. 4C, the second message consumer instance 112b continues to read from the second plurality of messages stored on the second physical topic 130b, but the first message consumer 130a, the first physical topic 130a, and the first plurality of messages 140a are represented with dotted lines to suggest that these resources may be destroyed, for example after expiration of time durations. For example, the first message consumer instance 112a may be destroyed after expiration of a predefined period of time when no unprocessed message is found on the first physical topic 130a. Alternatively, the first message consumer instance 112a may be destroyed after a predefined number of consecutive read failures (attempts to read from an empty first physical topic 130*a*). The first physical topic 130*a* may be destroyed after a predefined period of time allowed for the first message consumer instance 112*a* and/or other message consumer instances 130 to read messages from the first message topic.

It is understood that a plurality of different message producer instances 108 may be configured to write to the same physical topic 130. Additionally, a single message producer instance 108 may be configured to write to a plurality of different logical topic references 122, where each different logical topic reference 122 is resolved to a different physical topic reference 124. For example, a message producer instance 108 may be configured to write ad experience messages to an "ad experience event" logical topic reference 122 and to write URL access log messages to a "URL log" logical topic reference 122. In this case, the "ad experience event" logical topic reference 122 may resolve to a first physical topic reference 124 and the "URL log" logical topic reference 122 may resolve to a second physical topic reference 124. It is understood that a plurality of message consumer instances 112 may be configured with the same physical topic reference 124 and hence to read form the same physical topic 130. For example, a plurality of message consumer instances 112 may be instantiated with the same physical topic reference 124 to keep ahead of an influx of messages on the physical topic 130.

Figure 5A:
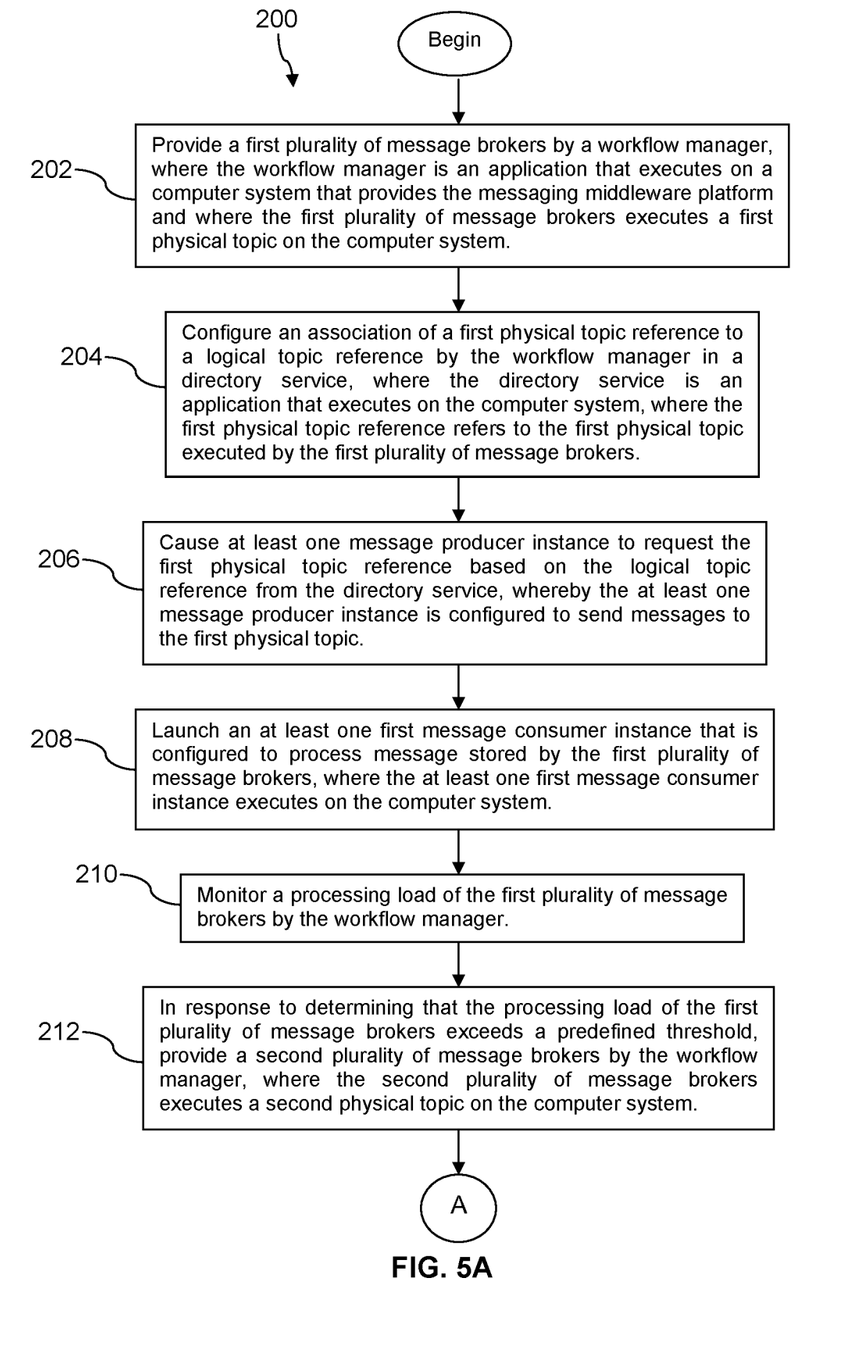
FIG. 5A and FIG. 5B are a flow chart of a method according to an embodiment of the disclosure.
Figure 5B:
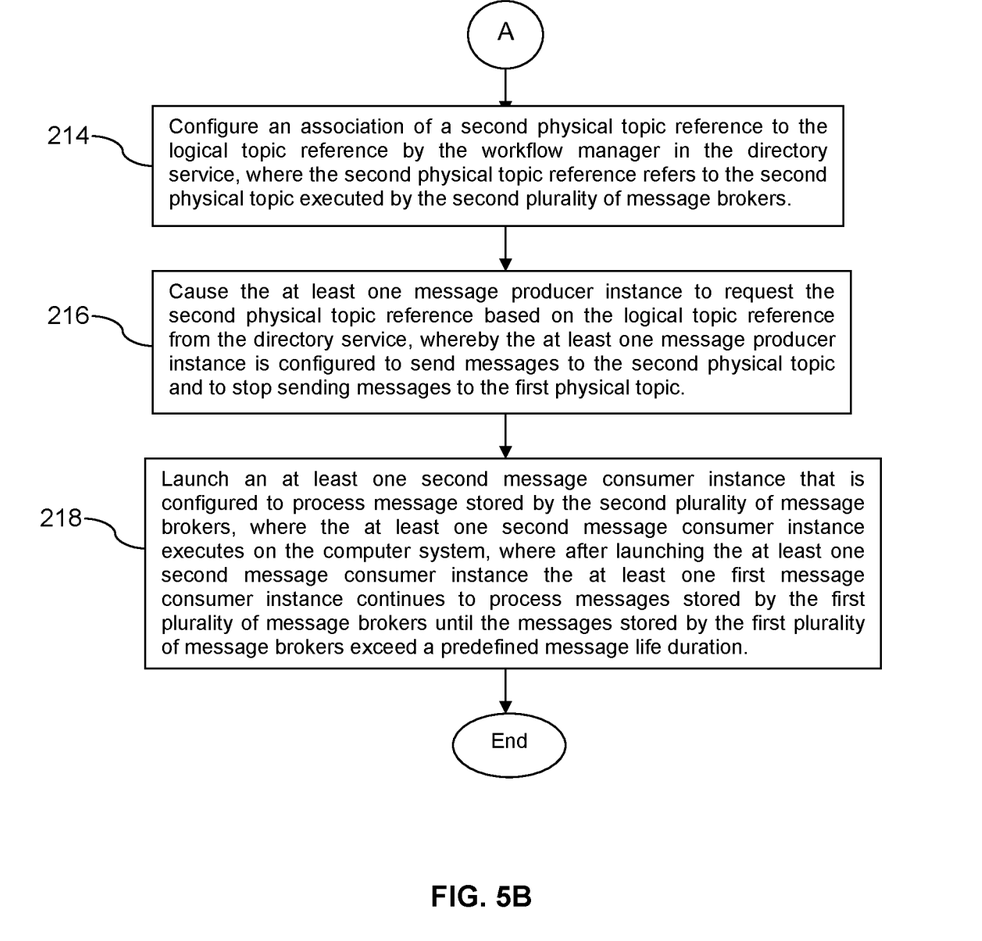

Turning now to FIG. 5, a method 200 is described. The method 200 may be used to process event messages with the messaging middleware platform 110 described above. At block 202, provide a first plurality of message brokers by a workflow manager, where the workflow manager is an application that executes on a computer system that provides the messaging middleware platform and where the first plurality of message brokers executes a first physical topic on the computer system. At block 204, configure an association of a first physical topic reference to a logical topic reference by the workflow manager in a directory service, where the directory service is an application that executes on the computer system, where the first physical topic reference refers to the first physical topic executed by the first plurality of message brokers. The processing of block 204 may entail writing entries or associations into the directory service.

At block 206, cause at least one message producer instance to request the first physical topic reference based on the logical topic reference from the directory service, whereby the at least one message producer instance is configured to send messages to the first physical topic. The message producer instance may be caused to request the resolution of the logical topic reference to the first physical topic reference on the event of its instantiation. For example, an initialization phase of the message producer instance may include the request for the resolution. Alternatively, the workflow manager application 132 may cause the message producer instance to request the resolution, for example by sending a command to an application programming interface (API) of the message producer instance.

At block 208, launch an at least one first message consumer instance that is configured to process message stored by the first plurality of message brokers, where the at least one first message consumer instance executes on the computer system. It is understood that the processing of blocks 206 and 208 may be reversed or may be performed about concurrently.

At block 210, monitor a processing load of the first plurality of message brokers by the workflow manager. Monitoring the processing load may comprise monitoring a queue depth on message queues maintained by the message brokers or monitoring a message depth associated with a physical topic. Monitoring the processing load may further comprise monitoring information flowing to message producer instances. At block 212, in response to determining that the processing load of the first plurality of message brokers exceeds a predefined threshold, provide a second plurality of message brokers by the workflow manager, where the second plurality of message brokers executes a second physical topic on the computer system.

At block 214, configure an association of a second physical topic reference to the logical topic reference by the workflow manager in the directory service, where the second physical topic reference refers to the second physical topic executed by the second plurality of message brokers. At block 216, cause the at least one message producer instance to request the second physical topic reference based on the logical topic reference from the directory service, whereby the at least one message producer instance is configured to send messages to the second physical topic and to stop sending messages to the first physical topic. It is understood that there may be message producer instances that are not commanded to request resolution of a logical topic reference, for example other message producer instances that are not configured with a physical topic reference related to the overloaded physical topic. At block 218, launch an at least one second message consumer instance that is configured to process messages stored by the second plurality of message brokers, where the at least one second message consumer instance executes on the computer system, where after launching the at least one second message consumer instance the at least one first message consumer instance continues to process messages stored by the first plurality of message brokers until the messages stored by the first plurality of message brokers exceed a predefined message life duration. In part, as a result of performing the method 200, the messages on the second plurality of message brokers are balanced without transferring messages among message brokers.

Figure 6:
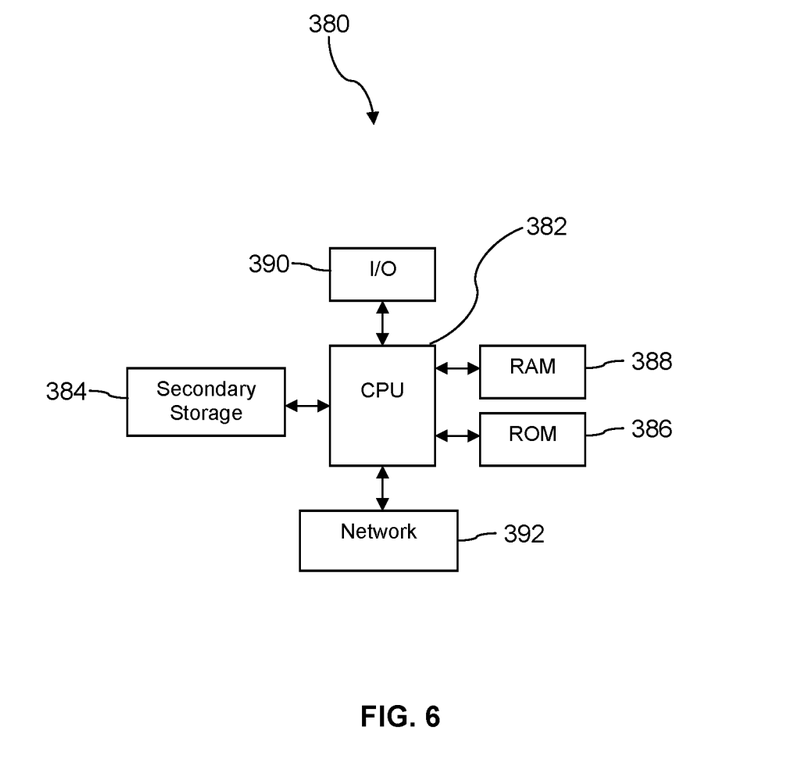
FIG. 6 is a block diagram of a computer system according to an embodiment of the disclosure.

FIG. 6 illustrates a computer system 380 suitable for implementing one or more embodiments disclosed herein. The computer system 380 includes a processor 382 (which may be referred to as a central processor unit or CPU) that is in communication with memory devices including secondary storage 384, read only memory (ROM) 386, random access memory (RAM) 388, input/output (I/O) devices 390, and network connectivity devices 392. The processor 382 may be implemented as one or more CPU chips.

It is understood that by programming and/or loading executable instructions onto the computer system 380, at least one of the CPU 382, the RAM 388, and the ROM 386 are changed, transforming the computer system 380 in part into a particular machine or apparatus having the novel functionality taught by the present disclosure. It is fundamental to the electrical engineering and software engineering arts that functionality that can be implemented by loading executable software into a computer can be converted to a hardware implementation by well-known design rules. Decisions between implementing a concept in software versus hardware typically hinge on considerations of stability of the design and numbers of units to be produced rather than any issues involved in translating from the software domain to the hardware domain. Generally, a design that is still subject to frequent change may be preferred to be implemented in software, because re-spinning a hardware implementation is more expensive than re-spinning a software design. Generally, a design that is stable that will be produced in large volume may be preferred to be implemented in hardware, for example in an application specific integrated circuit (ASIC), because for large production runs the hardware implementation may be less expensive than the software implementation. Often a design may be developed and tested in a software form and later transformed, by well-known design rules, to an equivalent hardware implementation in an application specific integrated circuit that hardwires the instructions of the software. In the same manner as a machine controlled by a new ASIC is a particular machine or apparatus, likewise a computer that has been programmed and/or loaded with executable instructions may be viewed as a particular machine or apparatus.

Additionally, after the system 380 is turned on or booted, the CPU 382 may execute a computer program or application. For example, the CPU 382 may execute software or firmware stored in the ROM 386 or stored in the RAM 388. In some cases, on boot and/or when the application is initiated, the CPU 382 may copy the application or portions of the application from the secondary storage 384 to the RAM 388 or to memory space within the CPU 382 itself, and the CPU 382 may then execute instructions that the application is comprised of. In some cases, the CPU 382 may copy the application or portions of the application from memory accessed via the network connectivity devices 392 or via the I/O devices 390 to the RAM 388 or to memory space within the CPU 382, and the CPU 382 may then execute instructions that the application is comprised of. During execution, an application may load instructions into the CPU 382, for example load some of the instructions of the application into a cache of the CPU 382. In some contexts, an application that is executed may be said to configure the CPU 382 to do something, e.g., to configure the CPU 382 to perform the function or functions promoted by the subject application. When the CPU 382 is configured in this way by the application, the CPU 382 becomes a specific purpose computer or a specific purpose machine.

The secondary storage 384 is typically comprised of one or more disk drives or tape drives and is used for non-volatile storage of data and as an over-flow data storage device if RAM 388 is not large enough to hold all working data. Secondary storage 384 may be used to store programs which are loaded into RAM 388 when such programs are selected for execution. The ROM 386 is used to store instructions and perhaps data which are read during program execution. ROM 386 is a non-volatile memory device which typically has a small memory capacity relative to the larger memory capacity of secondary storage 384. The RAM 388 is used to store volatile data and perhaps to store instructions. Access to both ROM 386 and RAM 388 is typically faster than to secondary storage 384. The secondary storage 384, the RAM 388, and/or the ROM 386 may be referred to in some contexts as computer readable storage media and/or non-transitory computer readable media.

I/O devices 390 may include printers, video monitors, liquid crystal displays (LCDs), touch screen displays, keyboards, keypads, switches, dials, mice, track balls, voice recognizers, card readers, paper tape readers, or other well-known input devices.

The network connectivity devices 392 may take the form of modems, modem banks, Ethernet cards, universal serial bus (USB) interface cards, serial interfaces, token ring cards, fiber distributed data interface (FDDI) cards, wireless local area network (WLAN) cards, radio transceiver cards that promote radio communications using protocols such as code division multiple access (CDMA), global system for mobile communications (GSM), long-term evolution (LTE), world-wide interoperability for microwave access (WiMAX), near field communications (NFC), radio frequency identity (RFID), and/or other air interface protocol radio transceiver cards, and other well-known network devices. These network connectivity devices 392 may enable the processor 382 to communicate with the Internet or one or more intranets. With such a network connection, it is contemplated that the processor 382 might receive information from the network, or might output information to the network in the course of performing the above-described method steps. Such information, which is often represented as a sequence of instructions to be executed using processor 382, may be received from and outputted to the network, for example, in the form of a computer data signal embodied in a carrier wave.

Such information, which may include data or instructions to be executed using processor 382 for example, may be received from and outputted to the network, for example, in the form of a computer data baseband signal or signal embodied in a carrier wave. The baseband signal or signal embedded in the carrier wave, or other types of signals currently used or hereafter developed, may be generated according to several methods well-known to one skilled in the art. The baseband signal and/or signal embedded in the carrier wave may be referred to in some contexts as a transitory signal.

The processor 382 executes instructions, codes, computer programs, scripts which it accesses from hard disk, floppy disk, optical disk (these various disk based systems may all be considered secondary storage 384), flash drive, ROM 386, RAM 388, or the network connectivity devices 392. While only one processor 382 is shown, multiple processors may be present. Thus, while instructions may be discussed as executed by a processor, the instructions may be executed simultaneously, serially, or otherwise executed by one or multiple processors. Instructions, codes, computer programs, scripts, and/or data that may be accessed from the secondary storage 384, for example, hard drives, floppy disks, optical disks, and/or other device, the ROM 386, and/or the RAM 388 may be referred to in some contexts as non-transitory instructions and/or non-transitory information.

In an embodiment, the computer system 380 may comprise two or more computers in communication with each other that collaborate to perform a task. For example, but not by way of limitation, an application may be partitioned in such a way as to permit concurrent and/or parallel processing of the instructions of the application. Alternatively, the data processed by the application may be partitioned in such a way as to permit concurrent and/or parallel processing of different portions of a data set by the two or more computers. In an embodiment, virtualization software may be employed by the computer system 380 to provide the functionality of a number of servers that is not directly bound to the number of computers in the computer system 380. For example, virtualization software may provide twenty virtual servers on four physical computers. In an embodiment, the functionality disclosed above may be provided by executing the application and/or applications in a cloud computing environment. Cloud computing may comprise providing computing services via a network connection using dynamically scalable computing resources. Cloud computing may be supported, at least in part, by virtualization software. A cloud computing environment may be established by an enterprise and/or may be hired on an as-needed basis from a third party provider. Some cloud computing environments may comprise cloud computing resources owned and operated by the enterprise as well as cloud computing resources hired and/or leased from a third party provider.

In an embodiment, some or all of the functionality disclosed above may be provided as a computer program product. The computer program product may comprise one or more computer readable storage medium having computer usable program code embodied therein to implement the functionality disclosed above. The computer program product may comprise data structures, executable instructions, and other computer usable program code. The computer program product may be embodied in removable computer storage media and/or non-removable computer storage media. The removable computer readable storage medium may comprise, without limitation, a paper tape, a magnetic tape, magnetic disk, an optical disk, a solid state memory chip, for example analog magnetic tape, compact disk read only memory (CD-ROM) disks, floppy disks, jump drives, digital cards, multimedia cards, and others. The computer program product may be suitable for loading, by the computer system 380, at least portions of the contents of the computer program product to the secondary storage 384, to the ROM 386, to the RAM 388, and/or to other non-volatile memory and volatile memory of the computer system 380. The processor 382 may process the executable instructions and/or data structures in part by directly accessing the computer program product, for example by reading from a CD-ROM disk inserted into a disk drive peripheral of the computer system 380. Alternatively, the processor 382 may process the executable instructions and/or data structures by remotely accessing the computer program product, for example by downloading the executable instructions and/or data structures from a remote server through the network connectivity devices 392. The computer program product may comprise instructions that promote the loading and/or copying of data, data structures, files, and/or executable instructions to the secondary storage 384, to the ROM 386, to the RAM 388, and/or to other non-volatile memory and volatile memory of the computer system 380.

In some contexts, the secondary storage 384, the ROM 386, and the RAM 388 may be referred to as a non-transitory computer readable medium or a computer readable storage media. A dynamic RAM embodiment of the RAM 388, likewise, may be referred to as a non-transitory computer readable medium in that while the dynamic RAM receives electrical power and is operated in accordance with its design, for example during a period of time during which the computer system 380 is turned on and operational, the dynamic RAM stores information that is written to it. Similarly, the processor 382 may comprise an internal RAM, an internal ROM, a cache memory, and/or other internal non-transitory storage blocks, sections, or components that may be referred to in some contexts as non-transitory computer readable media or computer readable storage media.

While several embodiments have been provided in the present disclosure, it should be understood that the disclosed systems and methods may be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted or not implemented.

Also, techniques, systems, subsystems, and methods described and illustrated in the various embodiments as discrete or separate may be combined or integrated with other systems, modules, techniques, or methods without departing from the scope of the present disclosure. Other items shown or discussed as directly coupled or communicating with each other may be indirectly coupled or communicating through some interface, device, or intermediate component, whether electrically, mechanically, or otherwise. Other examples of changes, substitutions, and alterations are ascertainable by one skilled in the art and could be made without departing from the spirit and scope disclosed herein.

What is claimed is:

1. A computer system that provides a messaging middleware platform that provides low-load message queue scaling, comprising:
at least one processor;
at least one non-transitory memory;
a directory service application stored in the at least one non-transitory memory that, when executed by the at least one processor:
creates an association between a logical topic reference and a first physical topic reference in response to receiving a first association creation request, and
provides the first physical message topic reference to a first request from a message producer instance based on the logical message topic reference provided in the first request; and
a workflow manager stored in the at least one non-transitory memory that, when executed by the at least one processor:
monitors a processing load of the messaging middleware platform,
in response to determining that the processing load of the messaging middleware platform exceeds a predefined threshold, sends a second association creation request to the directory service application to associate the logical topic reference to a second physical topic reference, wherein the directory service application creates a new association between the logical reference and the second physical topic reference in response to receiving the second association creation request,
launches a plurality of message brokers that execute a second physical topic associated with the second physical topic reference,
launches an at least one message consumer instance that is configured to process messages stored by the plurality of message brokers by requesting messages using the second physical topic reference, and
after launching the plurality of message brokers that execute the second physical topic, causes the message producer instance to send a second request comprising the logical message topic to the directory service application, where the directory service application provides the second physical message topic reference to the message producer instance based on the new association in response to the second request, wherein the message producer instance discontinues sending new messages to a first message broker associated with the first physical topic reference based on the new association and over time the first message broker is emptied by at least one other message consumer instance, and wherein the message producer instance begins sending new messages to the plurality of message brokers based on the new association and the messages on the plurality of message brokers are balanced without transferring messages among message brokers.

2. The computer system of claim 1, wherein the message producer instance creates messages that comprise information content in a JSON file format.

3. The computer system of claim 1, wherein the message producer instance normalizes information before encapsulating it in messages that it creates.

4. The computer system of claim 3, wherein the message producer receives information comprises logs of URLs, logs of ad experiences, and logs of locations of user equipments.

5. The computer system of claim 1, wherein the at least one other message consumer instance is destroyed after expiration of a predefined period of time after emptying the first e age broker associated with the first physical topic reference.

6. The computer system of claim 1, wherein the at least one other message consumer instance is destroyed after a predefined number of consecutive failed attempts to read a message from the first message broker associated with the first physical topic reference.

7. A method of processing event messages via a messaging middleware platform using low-load message queue scaling, comprising:
   providing a first plurality of message brokers by a workflow manager, where the workflow manager is an application that executes on a computer system that provides the messaging middleware platform and where the first plurality of message brokers executes a first physical topic on the computer system;
   configuring an association of a logical topic reference to a first physical topic reference by the workflow manager in a directory service, where the directory service is an application that executes on the computer system, where the first physical topic reference specifies an address of the first physical topic executed by the first plurality of message brokers;
   causing at least one message producer instance to request the first physical topic reference based on the logical topic reference from the directory service, whereby the at least one message producer instance is configured to send messages to the first physical topic;
   launching an at least one first message consumer instance that is configured to process messages stored by the first plurality of message brokers, where the at least one first message consumer instance executes on the computer system;
   monitoring a processing load of the first plurality of message brokers by the workflow manager;
   in response to determining that the processing load of the first plurality of message brokers exceeds a predefined threshold, providing a second plurality of message brokers by the workflow manager, where the second plurality of message brokers executes a second physical topic on the computer system, and wherein the second plurality of message brokers comprises an increased amount of message brokers compared to the first plurality of message brokers;
   configuring a new association of the logical topic reference to a second physical topic reference by the workflow manager in the directory service, where the second physical topic reference specifies an address of the second physical topic executed by the second plurality of message brokers;
   responsive to the configuration of the new association, causing the at least one message producer instance to request the second physical topic reference based on the logical topic reference from the directory service, wherein the at least one message producer instance is configured to send messages to the second physical topic and to stop sending messages to the first physical topic based on the new association; and
   launching an at least one second message consumer instance that is configured to process messages stored by the second plurality of message brokers, where the at least one second message consumer instance executes on the computer system, where after launching the at least one second message consumer instance, the first plurality of message brokers is emptied over time by the at least one first message consumer instance continuing to process remaining messages stored by the first plurality of message brokers, and
   wherein the messages on the second plurality of message brokers are balanced without transferring messages among message brokers.

8. The method of claim 7, wherein the at least one message producer instance receives information about URLs browsed by user equipments, normalizes the information about URLs, and stores the normalized information in at least some messages that it sends to the first physical topic.

9. The method of claim 8, wherein the user equipments are any combination of mobile phones, personal digital assistants (PDAs), media players, wearable computers, headset computers, laptop computers, tablet computers, or notebook computers.

10. The method of claim 7, wherein the at least one message producer instance receives information about ad experiences on user equipments, normalizes the information about ad experiences, and stores the normalized information in at least some messages that it sends to the first physical topic.

11. The method of claim 7, further comprising destroying the at least first message consumer instance after the association of the second physical topic reference to the logical topic reference is configured and after the first message consumer instance drains the first plurality of message brokers.

12. The method of claim 11, further comprising destroying the first plurality of message brokers after the at least first message consumer instance is destroyed.

13. The method of claim 7, wherein the workflow manager monitors the processing load of the first plurality of message brokers by monitoring a depth of messages stored by the first plurality of message brokers.

14. The method of claim 7, further comprising:
   in response to determining that the processing load of the second plurality of message brokers is less than a second predefined threshold, providing a third plurality of message brokers by the workflow manager, where the third plurality of message brokers executes a third physical topic on the computer system;
   configuring an association of a third physical topic reference to the logical topic reference by the workflow manager in the directory service, where the third physical topic reference specifies an address of the third physical topic executed by the third plurality of message brokers;
   causing the at least one message producer instance to request the third physical topic reference based on the logical topic reference from the directory service, whereby the at least one message producer instance is configured to send messages to the third physical topic and to stop sending messages to the second physical topic; and launching an at least one third message consumer instance that is configured to process messages stored by the third plurality of message brokers.

15. A messaging middleware platform implemented on a computer system, comprising:

a directory service application that maps logical topic references to physical topic references, where the physical topic references specify addresses of message topics instantiated on message broker instances;

a plurality of message producer instances that execute on the computer system, where each message producer instance stores messages on message topics instantiated based on a logical topic reference built into the message producer instance and dereferenced to a physical topic reference at run-time; and a workflow manager application that:

executes on the computer system that monitors message depth on a first plurality of message broker instances, wherein the first plurality of message broker instances executes a first physical topic associated with a first physical topic reference, creates at least one new message broker instance when the message depth is less than a predefined threshold, wherein the at least one new message broker instance executes a second physical topic and comprises a decreased amount of message broker instances compared to the first plurality of message broker instances, revises an association between a logical topic reference and the first physical topic reference in the directory service application, causes at least one message producer instance to be reconfigured to dereference the logical topic reference to a second physical topic reference associated with the at least one new message broker instances, wherein the at least one message producer instance is configured to send messages to the second physical topic and to stop sending messages to the first physical topic, and creates at least one new message consumer instance configured to process the messages on the at least one new message broker instance, wherein after creating the at least one new message broker instance, the first plurality of message brokers is emptied over time by at least one other message consumer instance continuing to process remaining messages on the first plurality of message broker instances, and wherein the messages on the at least one new message broker instance is balanced without transferring messages among message broker instances.

16. The messaging middleware platform of claim 15, wherein the message producer instances build the messages that they store on message topics and where the messages contain information formatted in JSON file format.

17. The messaging middleware platform of claim 15, wherein the message producer instances build the messages that they store on message topics and encapsulate information related to user equipments in the messages.

18. The messaging middleware platform of claim 17, wherein the information related to user equipments comprises information about locations of the user equipments.

19. The messaging middleware platform of claim 17, wherein the information related to user equipments comprises information about URLs browsed by the user equipments.

20. The messaging middleware platform of claim 17, wherein the information related to user equipments comprises information about ad experiences presented on the user equipments.

* * * * *